US012804294B2

(12) United States Patent
Simon et al.

(10) Patent No.: US 12,804,294 B2
(45) Date of Patent: Nov. 17, 2026

(54) METHODS AND DEVICES FOR PROCESSING UPLINK DATA FOR CASCADED PASSIVE OPTICAL NETWORKS

(71) Applicant: ORANGE, Issy-les-moulineaux (FR)

(72) Inventors: Gael Simon, Chatillon Cedex (FR); Philippe Chanclou, Chatillon Cedex (FR)

(73) Assignee: ORANGE, Issy-les-Moulineaux (FR)

(*) Notice: Subject to any disclaimer, the term of this patent is extended or adjusted under 35 U.S.C. 154(b) by 292 days.

(21) Appl. No.: 18/839,160

(22) PCT Filed: Feb. 17, 2023

(86) PCT No.: PCT/EP2023/054004
§ 371 (c)(1),
(2) Date: Aug. 16, 2024

(87) PCT Pub. No.: WO2023/156579
PCT Pub. Date: Aug. 24, 2023

(65) Prior Publication Data

US 2025/0159390 A1 May 15, 2025

(30) Foreign Application Priority Data

Feb. 17, 2022 (FR) ...................................... 2201406

(51) Int. Cl.
*H04B 10/00* (2013.01)
*H04L 69/324* (2022.01)
*H04Q 11/00* (2006.01)

(52) U.S. Cl.
CPC ....... *H04Q 11/0067* (2013.01); *H04L 69/324* (2013.01); *H04L 2212/00* (2013.01); *H04Q 2011/0081* (2013.01)

(58) Field of Classification Search
CPC ....... H04Q 11/0067; H04Q 2011/0081; H04Q 2011/0064; H04L 69/324; H04L 2212/00;
(Continued)

(56) References Cited

U.S. PATENT DOCUMENTS 12,035,083 B1 * 7/2024 Jia .......................... H04B 10/40
2009/0310596 A1 * 12/2009 Joyce ................. H04L 12/2801 370/352

(Continued)

OTHER PUBLICATIONS

English translation of the Written Opinion of the International Searching Authority dated Mar. 16, 2023 for corresponding International Application No. PCT/EP2023/054004, filed Feb. 17, 2023.

(Continued)

*Primary Examiner* — Agustin Bello
(74) *Attorney, Agent, or Firm* — David D. Brush; Westman, Champlin & Koehler, P.A.

(57) ABSTRACT

A method for uplink data transmission, implemented in an apparatus at a boundary between a first passive optical network and a second passive optical network and having a receive protocol stack and a transmit protocol stack. Data is received at a physical layer of the receive stack in a first uplink optical burst originating from the second passive optical network. The method includes in series, at a sublayer of the transport layer of the receive stack, referred to as an encapsulation level, transmitting the data directly to a service layer of the transmit stack, without processing by sublayers above the encapsulation level in the receive stack; successively processing in the transmission stack, by the service layer, by a transport layer and by a physical layer; and transmitting the data in a second uplink optical burst to the first passive optical network.

14 Claims, 2 Drawing Sheets

Figure 1:
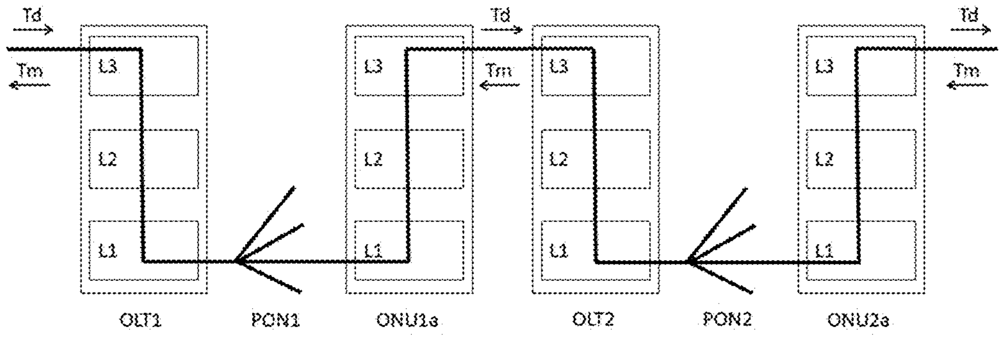

(58) Field of Classification Search
CPC ... H04L 67/562; H04L 67/563; H04L 69/321; H04L 69/322
See application file for complete search history.

(56) References Cited

U.S. PATENT DOCUMENTS

| | | | | |
|---|---|---|---|---|
| 2010/0083329 | A1* | 4/2010 | Joyce | H04N 21/64322 725/110 |
| 2012/0257891 | A1* | 10/2012 | Boyd | H04Q 11/0067 398/45 |
| 2012/0257893 | A1* | 10/2012 | Boyd | H04L 12/2801 398/58 |
| 2014/0199080 | A1* | 7/2014 | Ramesh | H04B 10/27 398/116 |
| 2019/0109665 | A1* | 4/2019 | Luo | H04L 12/4633 |
| 2020/0068279 | A1 | 2/2020 | Jaulin et al. | |
| 2020/0204257 | A1* | 6/2020 | Krampl | H04B 10/40 |
| 2022/0190931 | A1* | 6/2022 | Strobel | H04B 10/5167 |
| 2025/0159390 | A1* | 5/2025 | Simon | H04L 69/324 |

OTHER PUBLICATIONS

International Search Report dated Mar. 16, 2023 for corresponding International Application No. PCT/EP2023/054004, filed Feb. 17, 2023.

Written Opinion of the International Searching Authority dated Mar. 16, 2023 for corresponding International Application No. PCT/EP2023/054004, filed Feb. 17, 2023.

* cited by examiner

METHODS AND DEVICES FOR PROCESSING UPLINK DATA FOR CASCADED PASSIVE OPTICAL NETWORKS

CROSS-REFERENCE TO RELATED APPLICATIONS

This application is a Section 371 National Stage Application of International Application No. PCT/EP2023/054004, filed Feb. 17, 2023, and published as WO 2023/156579 A1 on Aug. 24, 2023, not in English, which claims priority to French Patent Application No. 2201406, filed Feb. 17, 2022, the contents of which are hereby incorporated by reference in their entireties.

1. FIELD OF THE INVENTION

The invention lies in the field of optical (fiber-optic) telecommunications and of the access networks of "passive optical network" (PON) type.

A passive optical network, or PON, denotes a level 1 transport principle in fiber-optics used in the "Fiber To The x" (FTTx) networks. It is characterized by a passive point-to-multipoint fiber architecture (several users share a same optical fiber and there is no active equipment between the exchange and the subscribers).

There are various PON network ITU (International Telecommunications Union) standards, including GPON (ITU-T G.984 standard), XGS-PON (ITU-T G.9807 standard), NG-PON2 (ITU-T G.989 standard), HS-PON (ITU-T G.9804 standard), etc., as well as various IEEE ("Institute of Electrical and Electronics Engineers") standards, such as E-PON, 10GE-PON, 50GE-PON, etc.

2. STATE OF THE PRIOR ART

In this context, the optical line terminal (OLT) at the exchange of the operator links the optical network units (ONU) deployed among the clients. The low cost of the PONs, their maturity and their point-to-multipoint topology makes them advantageous for applications that go beyond the FTTH ("Fiber To The Home") framework: FTTR ("fiber to the room", deployment of an optical skeleton in a home to link, for example, the home gateway with the Wi-Fi access points in each room), POL ("Passive optical LAN": optical LAN for enterprises-LAN: "Local Area Network"), FTTM ("Fiber to the machine": use of the PON technology to connect the machines of a factory/warehouse/ . . . to the network), etc.

To date, one natural solution for producing the FTTR/POL/FTTM would be to cascade the PON technologies. In the case of the FTTR for example, a first PON stage would link the exchange of the operator equipped with an OLT to the residence equipped with an ONU in a home gateway, and a second PON stage would distribute the signal in the different rooms of the residence with a second OLT in the home gateway and the rooms equipped with ONUs. However, that presupposes the deployment of heavy equipment (in the functional sense) in the home of the client, such as, for example, an OLT functionality added in the home gateway, and equipment offering an ONU functionality in the different rooms.

The PON technologies are based on a specific protocol stack, required to manage the specific topology of the PON (point-to-multipoint), making it possible to encapsulate and decapsulate the conventional Ethernet frames transparently. The PON technologies of the ITU employ the TC ("Transmission Convergence") layer which have several functions executed in series, including the encapsulation of the data streams or management in GEM ("Gigabit-capable passive optical network Encapsulation Method") frames, then GTC ("Gigabit-capable passive optical network Transmission Convergence"), which are next encoded and scrambled. Headers of these frames make it possible to manage the "switching" of the frames, and the priorities associated with the services. The binary sequence obtained is transposed into the analog (electrical) domain and is used to modulate the optical carrier which thus transports the information. The optical signal is then received, and the binary sequence received is in turn "unscrambled", decoded and decapsulated. The headers of the frames which transport the switching information then make it possible to switch the traffic to the right destination with the associated priority.

The protocol stack is passed through in both directions of transmission (from the OLT to the ONU for the downstream traffic, and the reverse for the upstream direction). Cascading several PON trees involves doing this at each stage of the cascade, which represents operations that are very intensive for equipment situated outside of the exchange of the operator. The fact that these operations are performed in electronic circuit boards outside of the domain controlled by the operator (the exchange), also limits the miniaturization of the equipment, this last point being important in some scenarios such as, for example, domestic use. This also involves an energy cost which is then attributed to the user.

One of the aims of the invention is to remedy these drawbacks of the state-of-the-art.

3. SUMMARY OF THE INVENTION

Downstream Direction

The invention improves the situation using a method for transmitting data in a downstream optical signal, implemented in a first optical line terminal of a first passive optical network, the data being received at a service layer, then processed in succession by the service layer, a transport layer and a physical layer, then transmitted at the physical layer, the method comprising, at the service layer, a processing of the data relating to at least one sublayer of the transport layer, called encapsulation layer, before the transmission of the data processed at the transport layer.

According to this method, the data are encapsulated in sublayers of the transport layer by a processing at the service layer. The data then undergo the conventional processing operations of the transport layer and of the physical layer.

Thus, if these data are intended for a second PON cascaded from the first PON, the processing operations that the OLT of this second PON must apply to the data are lightened. Indeed, when these data are received by an ONU of the first PON, after the successive processing operations of the physical layer, of the transport layer and of the service layer, they are in a format already comprising the processing operations performed by the OLT of the first PON, and which relate to the transport layer. The OLT of the second PON now only has to add to the processing operations which have not been performed in the OLT of the first PON.

It is understood that the method according to the invention can be seen as consisting in moving a part of the protocol stack from the second PON to the first PON. More specifically, the service layer, and the part of the transport layer located above a cut, are moved from the OLT of the second PON to the OLT of the first PON, to be processed there at the service layer which is above the transport layer, without the transport layer of the first OLT being modified.

Thus, the frames of the data are transmitted with this encapsulation by the first OLT, and are received in an optical signal by an ONU of the first PON. The data frames recovered by the ONU after de-stacking are transmitted to the second OLT serving the second PON, directly at the sublayer just below the cut.

The second OLT does not need to perform any processing relating to the sublayer (or to the sublayers) of the transport layer located above the cut. The second OLT now only has to apply to these frames a processing operation relating to the remaining sublayer (or to the remaining sublayers) located below the cut of the transport layer, that is to say the processing of the sublayers which have not been encapsulated by the first OLT (which comprise in particular all the sublayers of the physical layer). This commensurately lightens the processing operations that the second OLT must perform before transmitting the data frames to a second ONU of the second PON.

The cut between the encapsulated sublayers and the non-encapsulated sublayers can be determined as a function of the processing capabilities of the second OLT, or other criteria such as, for example, the available computation resources or the available energy supply.

For convenience in this document, the term "encapsulation" generally denotes any processing performed in the transport layer in order to prepare a data frame for its processing by the physical layer, that is to say in the downstream direction of the protocol stack, from the so-called high layers to the so-called low layers. The processing operations of the transport layer in the downstream direction include, for example, depending on the sublayer concerned, fragmentation, encryption, embedding of OAM (Operation Administration & Maintenance) information, scrambling, etc.

This transmission method is entirely transparent for the ONUs of the first PON and for the ONUs of the second PON, and allows for a reduction of the processing operations in the second OLT, which is reflected by savings in terms of required computation power and necessary energy. This is advantageous because the second OLT, which is at the root of the second PON, is not situated in an exchange of the operator but rather at the home of a client where the ONU is located, in hardware equipment which can be either connected physically to the ONU of the client, or incorporated in the ONU of the client.

According to one aspect of the transmission method, the encapsulation relates to all the sublayers of the transport layer.

In other words, according to this aspect, the method comprises, for the data frames intended for the second ONU, and prior to the processing operations at the transport layer and at the physical layer, an encapsulation of the data frames in all the transport layer.

Thus, when the cut is located between the physical layer and the transport layer, that is to say with an encapsulation, by the first OLT, of all the transport layer, the second OLT no longer has any processing to be performed at the transport layer for the data frames, and can transmit them directly to its physical layer. This lightens as much as possible the processing operations that the second OLT must perform for the data frames intended for the ONUs of the second PON.

According to one aspect, the transmission method comprises, at the service layer and prior to the encapsulation, another encapsulation relating to at least one sublayer of the transport layer.

Thus, if more than two PONs are disposed cascaded, that is to say if the second ONU of the second PON is connected to a third OLT at the root of a third PON, this third OLT can also make processing savings at the service and transport layers. In the OLT of the first PON, the frames intended for an ONU of this third PON are encapsulated a first time according to a cut of the transport layer specific to the third PON, then encapsulated a second time according to a cut of the transport layer specific to the second PON. Indeed, the cuts of the protocol stack for the encapsulation can be different from one PON cascade stage to another.

The invention is not limited to two, or three cascaded passive optical networks. Thus, if N PONs are disposed cascaded, the frames intended for one ONU of this Nth PON can be encapsulated N−1 times according to the successive cuts of the transport layer of each of the PONs, by beginning with the cut of the Nth PON and by ending with this second PON.

The invention relates also to a downstream data transmission method, implemented in an equipment at the boundary between a first passive optical network and a second passive optical network and comprising a reception protocol stack and a transmission protocol stack, the data being received in a first downstream optical signal from the first passive optical network, at a physical layer of the reception stack, then processed in succession in the reception stack by the physical layer (L1), a transport layer (L2) and a service layer (L3), the method comprising:

- at the service layer, a detection of an encapsulation of the data relating to at least one sublayer (L2d') of the transport layer (L2),
- a transmission of the encapsulated data, from the reception stack to the transmission stack, directly at a level (L2d) immediately below the at least one transport sublayer, called encapsulation layer, without processing relating to the at least one transport sublayer,
- successive processing operations in the transmission stack to a physical layer (L1), from the encapsulation level,
- a transmission of the data in a second, downstream optical signal, to the second passive optical network (PON2).

By virtue of the encapsulation of the frames which is performed in the first OLT of the first PON, the second OLT of the second PON saves on the processing operations relating to the encapsulated sublayers, since they have already been performed at the first OLT. This lightens the equipment hosting the second OLT, which is particularly advantageous in the case where this equipment is located at the home of a client of the operator of the first PON. Furthermore, since an ONU of the first PON is already located at the same point, this lightening facilitates the incorporation of the second OLT with the ONU of the first PON in one and the same hardware equipment FGW (for Fiber Gateway), which can be an optical network gateway, such as, for example an Internet access home or professional gateway, modified.

The choice of the sublayers which are encapsulated in the downstream direction is made as a function of a cut of the protocol stack which determines the part of this stack which is functionally shifted from the second PON to the OLT of the first PON. The cut thereby determines a link of complementarity between the first OLT and the second OLT.

According to this downstream transmission method, the ONU functionality of the incorporated equipment detects, at the service layer, the presence or the absence of the encapsulation. In the case of presence of an encapsulation, that means that the frame is intended to continue its path to the second PON which is cascaded on the first PON. In the case of absence of encapsulation, that means that the frame has as its destination the ONU function, or more specifically has as its final destination an equipment connected to a local area network served by the ONU, for example a home Wi-Fi network.

The invention relates also to a device for transmitting data in a downstream optical signal, included in a first optical line terminal of a first passive optical network, the data being received at a service layer, then processed in succession by the service layer, a transport layer and a physical layer, then transmitted at the physical layer, the device comprising receivers, transmitters, a processor and a memory coupled to the processor with instructions intended to be executed by the processor for, at the service layer, a processing of the data relating to at least one sublayer of the transport layer, called encapsulation layer, before transmission of the processed data to the transport layer.

This device, capable in all of its embodiments of implementing the transmission method which has just been described, is intended to be implemented in an optical line terminal serving optical network units through a first passive optical network, at least one of which is connected to another optical network terminal serving other optical network units through a second passive optical network.

According to one aspect, the transmission device further comprises a first unit for the management of the configurations, of the failures, of the performance levels and of the security of the first passive optical network, and a second unit for the management of the configurations, of the failures, of the performance levels, and of the security of the second passive optical network.

When two passive optical networks are cascaded, according to the invention and contrary to the prior art, it is the optical line terminal of the first passive optical network which manages the configurations, failures, performance levels, and security of the passive optical networks of each stage of the cascade. The shifting of this function into the first optical line terminal thus lightens the optical line terminals of the second stage of the cascade, while allowing a synchronized and harmonized management of the OMCI (ONU Management and Control Interface) messages circulating in all the passive optical networks of the cascade.

The invention relates also to a downstream data transmission device, included in an equipment at the boundary between a first passive optical network and a second passive optical network and comprising a reception protocol stack and a transmission protocol stack, the data being received in a first downstream optical signal originating from the first passive optical network, at a physical layer of the reception stack, then processed in succession in the reception stack by the physical layer, a transport layer and a service layer, the device comprising receivers, transmitters, a processor and a memory coupled to the processor with instructions intended to be executed by the processor for:

at the service layer, a detection of an encapsulation of the data relating to at least one sublayer of the transport layer, a transmission of the encapsulated data, from the reception stack to the transmission stack, directly at a level immediately below the at least one transport sublayer, called encapsulation level, without processing relating to the at least one transport sublayer, successive processing operations in the transmission stack up to a physical layer, from the encapsulation level, a transmission of the data in a second downstream optical signal, to the second passive optical network.

This device, capable in all its embodiments of implementing the downstream transmission method which has just been described, is intended to be implemented in a passive network gateway, such as, for example, an Internet access "fiber" gateway, home or professional.

The invention relates also to a cascaded system of passive optical networks for the transmission of downstream data, comprising a transmission device, such as that which has just been described, connected to a plurality of downstream transmission devices such as that which has just been described, through the first passive optical network, at least one such downstream transmission device being connected to a plurality of optical network units through a second passive optical.

The invention relates also to a computer program comprising instructions which, when these instructions are executed by a processor, cause the latter to implement the steps of the transmission method which has just been described.

The invention also targets an information medium that can be read by an optical network terminal, and comprising instructions of a computer program as mentioned above.

The invention relates also to a computer program comprising instructions which, when these instructions are executed by a processor, cause the latter to implement the steps of the downstream transmission method, which has just been described.

The invention also targets an information medium that can for example be read by an Internet access fiber gateway, and comprising instructions of a computer program as mentioned above.

Upstream Direction

The invention improves the situation using an upstream data transmission method, implemented in an equipment at the boundary between a first passive optical network and a second passive optical network and comprising a reception protocol stack and a transmission protocol stack, the data being received at a physical layer of the reception stack in a first upstream optical burst originating from the second passive optical network, the method comprising, in succession:

at a sublayer of the transport layer of the reception stack, called encapsulation level, a transmission of the data directly to a service layer of the transmission stack, without processing by sublayers above the encapsulation level in the reception stack, successive processing operations in the transmission stack, by the service layer, by a transport layer and by a physical layer, a transmission of the data in a second upstream optical burst to the first passive optical network.

In the upstream direction, in the OLT of the second PON, contrary to the prior art, the processing operations relating to the sublayers of the transport layer are omitted. These processing operations will be performed more upstream at the OLT of the first PON. This lightens the equipment hosting the second OLT, which is particularly advantageous in the case where this equipment is located in the home of a client of the operator of the first PON. In addition, since an ONU of the first PON is already located at the same point, this lightening facilitates the incorporation of the second OLT with the ONU of the first PON in one and the same FGW (Fiber Gateway) hardware equipment, which can be an optical network gateway, such as, for example, a home or professional Internet access gateway, modified.

The choice of the sublayers which are not decapsulated in the upstream direction is made as a function of a cut of the protocol stack which determines the part of this stack which is shifted functionally from the second PON to the OLT of the first PON. The cut thereby determines a link of complementarity between the first OLT and the second OLT. The cut in the upstream direction can differ from the cut in the downstream direction. There can also be a cut in only one of the two transmission directions.

For convenience in this document, the term “decapsulation” generally denotes any processing operation performed in the transport layer on data after processing by the physical layer, that is to say in the upward direction of the protocol stack, from the so-called low layers to the so-called high layers. The processing operations of the transport layer in the upstream direction include, for example, depending on the sublayer concerned, unscrambling, recovery of the OAM information (“PLOAM parsing”), decryption, reassembly, etc. It should be noted that, in the context of the PONs, the term “optical burst” is used for the upstream direction, rather than the term “optical signal”, reserved for the downstream direction.

According to one aspect, the upstream transmission method comprises, at the encapsulation level, before the transmission of the data to the service layer of the transmission stack, an Ethernet frame formatting of the data and an insertion into the ethernet frame of information indicative of the encapsulation.

Thus, the fact that processing operations relating to sublayers of the transport layer are omitted is transmitted as information in a field of the Ethernet frames. It will be easy for the OLT of the first PON to distinguish these Ethernet frames from the Ethernet frames originating from an ONU of the first PON, which, for their part, do not have this feature.

Optionally, information indicative of the level of the encapsulation can also be inserted into the Ethernet frames.

The invention relates also to a method for reception of data in an upstream optical burst, implemented in a first optical line terminal of a first passive optical network, the data being received at a physical layer, then processed in succession and in addition by the physical layer and by a transport layer, the method comprising,

- at a service layer, a detection of processing operations missing from the data, relating to at least one sublayer of the transport layer, above a level called encapsulation level,
- at the service layer, a processing of the data relating to sublayers of the transport layer above the encapsulation level, to obtain a data frame.

The missing processing operation according to the sublayer or sublayers of the transport layer is not performed in the OLT of the second PON but is shifted to the OLT of the first PON. After complete processing of the frame by the transport layer, that is to say after its complete decapsulation, it is transmitted to the service layer, which checks the presence or the absence of an additional encapsulation, in other words a second recursive encapsulation in the first encapsulation.

In the case of additional encapsulation, that means that the frame originates from the second PON and that the OLT must complete decapsulating the frame. In the case of absence of additional encapsulation, that means that the frame originates from the first PON and that its processing by the transport layer is completely finished.

According to one aspect of the reception method, the detection of missing processing consists in checking that the data are not in an Ethernet or OMCI format.

A first way of detecting that a processing operation is missing is to check the format in which the data are delivered by the transport layer. Indeed, according to the prior art, the data expected by the service layer should be in the Ethernet or OMCI (ONU Management and Control Interface) format. If they are not in the Ethernet or OMCI format, that means that the processing thereof is not finished.

According to one aspect of the reception method, the detection of missing processing operation consists in checking that Ethernet frames containing data include information indicative of an encapsulation.

A second way of detecting that a processing operation is missing relies on a prior formatting of the data as Ethernet frames, performed upstream in the OLT of the second PON, at the encapsulation level. In addition to the Ethernet formatting, the OLT of the second PON inserts into a determined field of each Ethernet frame, information indicating the presence of the encapsulation, and, optionally, information indicating the encapsulation level. Thus, when the OLT of the first PON receives the data at the output of its transport layer, they are all in the form of Ethernet frames (or OMCI messages), whether they originate from the first PON or the second PON. The data frames originating from an ONU of the first PON and not originating from the second PON do not include the information indicative of the encapsulation, that is say indicative of a missing processing operation. It is therefore possible to distinguish these data frames from the data frames originating from an ONU of the second PON, which, for their part, include, in a field, the information indicative of a missing processing operation.

According to one aspect of the reception method, the missing processing operation detected relates to all the sublayers of the transport layer.

In other words, according to this aspect, the first OLT decapsulates all the transport layer of the frame twice: a first time, following the passage of the frame in an optical burst through the first PON, then a second time, to compensate for the absence of decapsulation after its passage in a prior optical burst, through the second PON.

Thus, when the cut in the upstream direction is located exactly between the physical layer and the transport layer, the OLT of the first PON performs all the processing operations of the transport layer, that the OLT of the second PON no longer has to perform.

This lightens as much as possible the processing operations that the second optical line terminal must perform for the data frames originating from the ONU of the second PON.

According to one aspect, the reception method comprises, following the processing relating to the sublayers above the encapsulation level:

- at the service layer, another detection of processing operations missing from the data, relating to at least one sublayer of the transport layer, above another level, called other encapsulation level,
- at the service layer, another processing of the data relating to sublayers of the transport layer above the other encapsulation level, to obtain a data frame.

Thus, if more than two PONs are disposed cascaded, that is to say if the second ONU of the second PON is connected to a third OLT at the root of a third PON, this third OLT can also save on processing operations at the service and transport layers, according to a cut of the sublayers of the transport layer, which can be different from one PON stage to another.

The invention relates also to an upstream data transmission device, at the boundary between a first passive optical network and a second passive optical network, comprising a reception protocol stack and a transmission protocol stack, the data being received at a physical layer of the reception stack in a first upstream optical burst originating from the second passive optical network, the device comprising receivers, transmitters, a processor and a memory coupled to the processor with instructions intended to be executed by the processor for:

at a sublayer of the transport layer of the reception stack, called encapsulation level, a transmission of the data to a service layer of the transmission stack, without processing by sublayers above the encapsulation level in the reception stack, successive processing operations in the transmission stack, by the service layer, by a transport layer and by a physical layer, a transmission of the data in a second upstream optical burst to the first passive optical network.

This device, capable in all its embodiments of implementing the upstream transmission method which has just been described, is intended to be implemented in an optical network gateway, such as, for example, a home or professional Internet access “fiber” gateway.

The invention relates also to a device for receiving data in an upstream optical burst, included in a first optical line terminal of a first passive optical network, the data being received at a physical layer, then processed in succession and fully by the physical layer and by a transport layer, the device comprising receivers, transmitters, a processor and a memory coupled to the processor with instructions intended to be executed by the processor for:

at a service layer, a detection of processing operations missing from the data, relating to at least one sublayer of the transport layer, above a level called encapsulation level, at the service layer, a processing of the data relating to sublayers of the transport layer above the encapsulation level, to obtain a data frame.

This device, capable in all its embodiments of implementing the reception method which has just been described, is intended to be implemented in an optical line terminal serving optical network units through a first passive optical network, at least one of which is connected to another optical network terminal serving other optical network units through a second passive optical network.

According to one aspect, the reception device further comprises a first unit for the management of the configurations, of the failures, of the performance levels, and of the security of the first passive optical network, and a second unit for the management of the configurations, of the failures, of the performance levels, and of the security of the second passive optical network.

When two passive optical networks are cascaded, according to the invention and contrary to the prior art, it is the optical line terminal of the first passive optical network which manages the configurations, failures, performance levels, and security of the passive optical networks of each stage of the cascade. The shifting of this function into the first optical line terminal thus lightens the optical line terminals of the second stage of the cascade, while allowing a synchronized and harmonized management of the OMCI (ONU Management and Control Interface) messages circulating in all the passive optical networks of the cascade.

According to one aspect, the reception device further comprises a first unit for the management of the upstream bandwidth allocation of the first passive optical network, and a second unit for the management of the upstream bandwidth allocation of the second passive optical network.

When two passive optical networks are cascaded, according to the invention and contrary to the prior art, it is the optical line terminal of the first passive optical network which manages the upstream bandwidth allocation of the passive optical networks of each stage of the cascade. The shifting of this function into the first optical line terminal thus lightens the optical line terminals of the second stage of the cascade, while allowing a synchronized and harmonized management of all the passive optical networks of the cascade.

The invention relates also to a system of cascaded passive optical networks for the reception of upstream data, comprising a reception device such as that which has just been described, connected to a plurality of upstream transmission devices such as that which has just been described, through the first passive optical network, at least one such upstream transmission device being connected to a plurality of optical network units through a second passive optical.

The invention relates also to a computer program comprising instructions which, when these instructions are executed by a processor, cause the latter to implement the steps of the upstream transmission method, which has just been described.

The invention also targets an information medium that can be read for example by an Internet access fiber gateway, and comprising instructions of a computer program as mentioned above.

The invention relates also to a computer program comprising instructions which, when these instructions are executed by a processor, cause the latter to implement the steps of the reception method, which has just been described.

The invention also targets an information medium that can be read by an optical network terminal, and comprising instructions of a computer program as mentioned above.

The programs mentioned above can use any programming language, and be in the form of source code, object code, or intermediate code between source code and object code, such as in a partially compiled form, or in any other desirable form.

The information media mentioned above can be any entity or device capable of storing the program. For example, a medium can comprise a storage means, such as a ROM, for example a CD ROM or a microelectronic circuit ROM, or even a magnetic storage means.

Such a storage means can for example be a hard disk, a flash memory, etc. Also, an information medium can be a transmissible medium such as an electrical or optical signal, which can be conveyed via an electrical or optical cable, by radio or by other means. A program according to the invention can in particular be downloaded over a network of Internet type.

Alternatively, an information medium can be an integrated circuit in which a program is incorporated, the circuit being adapted to execute or to be used in the execution of the methods concerned.

4. DESCRIPTION OF THE FIGURES

Figure 2:
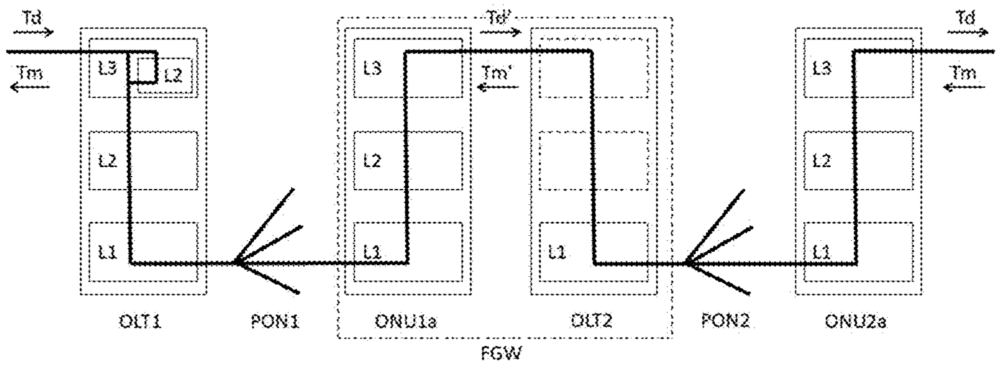
Figure 3:
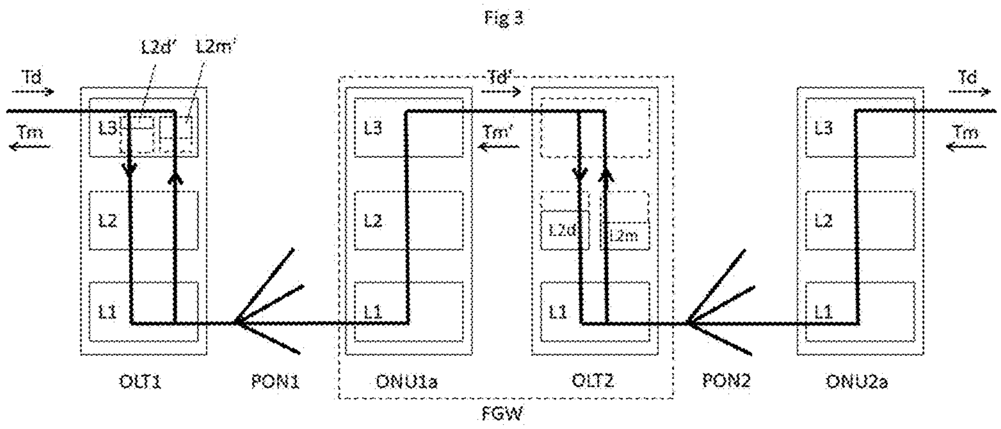
Figure 4:
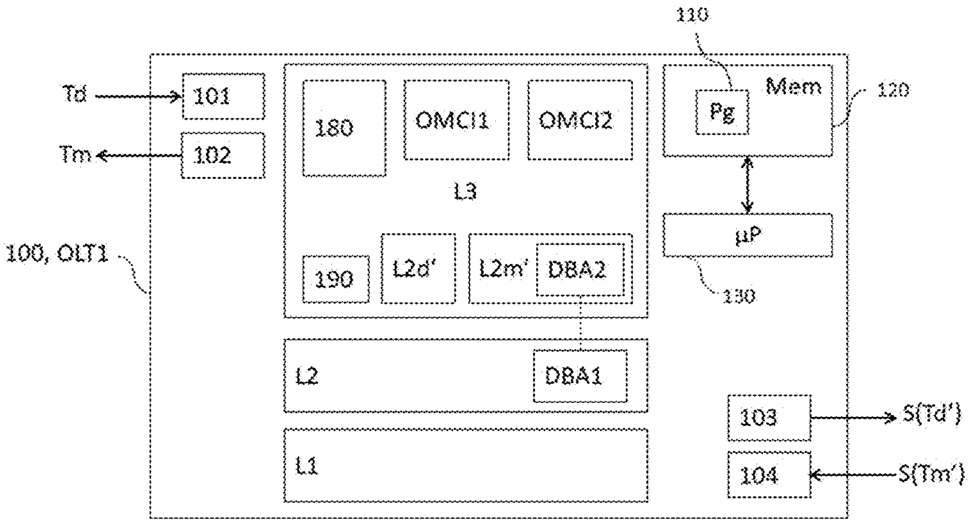
Figure 5:
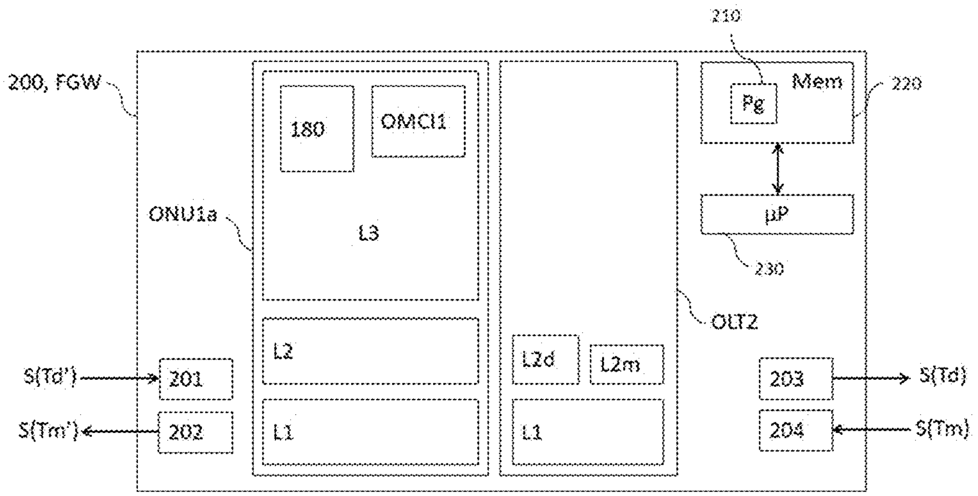

Other advantages and features of the invention will become more clearly apparent on reading the following description of a few particular embodiments of the invention, given as simple illustrative and nonlimiting examples, and the attached drawings, in which:

FIG. 1 schematically presents two cascade-connected passive optical networks, according to the prior art, FIG. 2 schematically presents two cascade-connected passive optical networks, according to a first aspect of the invention, FIG. 3 schematically presents two cascade-connected passive optical networks, according to a second aspect of the invention, FIG. 4 presents an example of structure of an optical network terminal, implementing the data transmission method in a downstream optical signal, and the data reception method in an upstream optical burst, according to aspects of the invention, FIG. 5 presents an example of structure of an optical network gateway, implementing the data transmission method in a downstream optical signal, and the data transmission method in an upstream optical burst, according to aspects of the invention.

5. DETAILED DESCRIPTION OF AT LEAST ONE EMBODIMENT OF THE INVENTION

The PON technologies are based on a specific protocol stack, required to manage the specific topology of the PON (point-to-multipoint), making it possible to encapsulate and decapsulate the conventional Ethernet frames transparently. The PON technologies of the ITU, for example, employ the TC (Transmission Convergence) layer which have several functions executed in series, including the encapsulation of the data or management stream in GEM (Gigabit-capable passive optical network Encapsulation Method), then GTC (Gigabit-capable passive optical network Transmission Convergence) frames, which are then encoded and scrambled. GEM and GTC being related to the G-PON technology, the other PON technologies (XGS-PON, HS-PON, etc.) have similar functions that have other names. Headers of these frames make it possible to manage the "switching" of the frames, and the priorities associated with the services. The binary sequence obtained is transposed into the analog (electrical) domain and serves to modulate the optical signal which thus transports the information. The optical signal is then received, and the binary sequence received is in turn "unscrambled", decoded, and de-encapsulated. The headers of the frames which transport the switching information then make it possible to switch the traffic to the right destination with the associated priority.

The protocol stack is passed through in both directions of transmission (from the OLT to the ONU for the downstream traffic, and in reverse for the upstream direction).

The different layers and sublayers of the ITU-standardized protocol stack are summarized in the following table (upper lavers first):

| | | | |
|---|---|---|---|
| SDU layer | | | L3 |
| TC layer | Service Adaptation | Frame Fragmentation/Assembly | L2 |
| TC layer | Service Adaptation | Ethernet - GEM | L2 |
| TC layer | Service Adaptation | OMCI - GEM | L2 |
| TC layer | Service Adaptation | GEM Encryption/Decryption | L2 |
| TC layer | Service Adaptation | GEM - GTC | L2 |
| TC layer | Framing | OAM Embedding/Parsing | L2 |
| TC layer | Framing | PLOAM Embedding/Parsing | L2 |
| TC layer | PHY Adaptation | FEC Encaps/Decaps | L2 |
| TC layer | PHY Adaptation | Scrambling/Descrambling | L2 |
| TC layer | PHY Adaptation | Synchro, Delineation | L2 |
| PMD layer | | | L1 |

This table is not exhaustive, and presents, by way of example, some of the sublayers of the TC layer for the case of a G-PON according to the ITU standard.

The different layers and sublayers of the IEEE-standardized protocol stack are another example and are summarized in the following table (upper lavers first):

| | | |
|---|---|---|
| Network layer | LAN & CSMA/CD layers | L3 |
| Data link layer | MAC Client | L2 |
| Data link layer | OAM (optional) | L2 |
| Data link layer | MULTIPOINT MAC CONTROL (MPCP) | L2 |
| Data link layer | MAC - MEDIA ACCESS CONTROL | L2 |
| Physical layer | RECONCILIATION sublayer | L1 |
| Physical layer | PHYSICAL CODING SUBLAYER (including optional Forward Error Correction) | L1 |
| Physical layer | PHYSICAL MEDIUM ATTACHMENT (PMA) | L1 |
| Physical layer | PMD layer | L1 |

This table is not exhaustive, and presents, by way of example, some of the layers and sublayers for the case of a 10GE-PON according to the IEEE standard.

For simplicity in the rest of the document, regardless of the protocol stack, as indicated in the tables above, the different layers and sublayers are grouped together in three groups of layers respectively corresponding to a physical layer denoted L1, a transport layer denoted L2 and a service layer denoted L3. The layers of the ITU and IEEE standards have equivalent functions and the rest of the document is based on those of the ITU standard, for simplicity.

FIG. 1 illustrates two passive optical networks disposed cascaded, according to the prior art.

In the downstream direction, the data transmitted by an upstream transmitter arrive at the OLT denoted OLT1, for example in the form of Ethernet frames. The data of such an Ethernet frame Td are processed in succession by the layers L3, L2 and L1 of OLT1, then are transmitted in the form of a downstream optical signal, in the first-level PON denoted PON1, which serves a plurality of ONUs for example through an optical coupler, including the ONU denoted ONU1a, which receives the optical signal at the layer L1. The optical signal received by the ONU1a is then processed in succession by the layers L1, L2 and L3. At the output of the layer L3 of the ONU1a, the frame Td is recovered and ready to be delivered to the second-level PON denoted PON2, if its final destination is served by the PON2.

If such is the case, the same processing operations as in the OLT1 are then applied to the data of the frame Td by the OLT2, which transmits the data in a second optical signal in the PON2. Next, this second optical signal transports, in the PON2, the data of the frame Td to a plurality of ONUs including the ONU denoted ONU2a, which applies to them the same processing as the ONU1a. At the output of the layer L3 of the ONU2a, the frame Td is recovered and can continue its progress to its final destination.

In the upstream direction, the operations described above are performed in reverse direction for a frame Tm.

FIG. 2 schematically presents two cascade-connected passive optical networks, according to a first aspect of the invention.

This first aspect corresponds to a particular embodiment in which the layer L3 in its entirety and the layer L2 in its entirety, that is to say the entire service layer and the entire transport layer, are shifted from the OLT2 to the OLT1, in both transmission directions.

In the downstream direction, when a frame Td arrives at the OLT1 at the layer L3, the OLT1 checks the final destination of the frame Td. There are then two possible cases: either the final destination of the frame Td is served by the PON2 which is cascaded from the PON1, or it is not. In the latter case, the data of the frame Td undergo the conventional processing operations of the layers L3, L2 and L1 according to the prior art.

When the data are transmitted by an OLT to the ONUs (downstream direction), they are processed in succession by the layers L3, L2 and L1. The processing operations of the layer L3 correspond for example to the switching of the Ethernet or OMCI information frames to the layer L2 of the OLT. The processing operations of the layer L2 correspond for example to the fragmentation of an Ethernet or OMCI information frame into GEM frames, to the encryption thereof, to the fragmentation into GTC frames, to the embedding of the administration and management information intended for the OLT or the ONUs, to the scrambling of the frames and to the synchronization thereof before the sending of the electrical signal thus generated on the optical transmitter. The processing operations of the layer L1 correspond for example to the transmission of an optical signal from an electrical signal via an optical transmitter, to the propagation in the optical fiber, and to the detection of the optical signal by a photoreceiver which transforms the optical signal into an electrical signal.

The OMCI information, or OMCI messages, are signaling frames exchanged between an OLT and the ONUs of a same PON, for the management of the configurations, of the failures, of the performance levels, and of the security of the PON system.

In the first case, however, that is to say for example if the final destination of the frame Td is the ONU2a served by the PON2, the layer L3 of the OLT1 is modified and, in addition to the processing operations of layer L3, the layer L3 of the OLT1 encapsulates the frame Td in the layer L2, before delivering it to the layer L2. The layer L2 of the OLT1 is not modified and once again encapsulates the frame Td, then delivers it to the layer L1, which is not modified either.

Next, the data of the frame Td are received in a first optical signal by the ONU1a, at the layer L1. The optical signal processed in succession by the layers L1, L2 and L3. At the output of the layer L3 of the ONU1a, the frame Td' which is recovered differs from the frame Td in that it has already undergone beforehand the processing operations of the layer L2 of the OLT2. It is already “encapsulated” in the layer L2, and it is ready to be delivered directly to the layer L1 of the modified OLT2 of the PON2, without processing operations in the layers L3 and L2. The OLT2 is therefore lightened, because it does not need to have components necessary to the processing of the layers L2 and L3.

The data of the frame Td' are then transmitted in a second optical signal in the PON2. This second optical signal transports in the PON2 the data of the frame Td' to a plurality of ONUs, including the ONU2a, which applies to them the same processing as the ONU1a. At the output of the layer L3 of the ONU2a, the frame which is recovered is the frame Td, and not the frame Td'. It should however be noted that the data of the two frames are the same; only their formats differ.

In the upstream direction, when a frame Tm arrives at the layer L3 of the ONU2a, it undergoes in succession the processing operations of the layers L3, L2, L1 as in the prior art. The data of the frame Tm are then transmitted in a first optical burst returning the PON2 to the layer L1 of the OLT2 which is modified. Indeed, the frame Tm' which is delivered by the OLT2 in the upstream direction (as in the downstream direction otherwise) has undergone no processing at the layers L2 and L3. The ONU1a receiving the frame Tm' processes it in succession at the layers L3, L2 and L1 as in the prior art, and transmits the data included in the frame in an optical burst towards the OLT1.

When a burst of data is received by an OLT originating from the ONUs (upstream direction), they are processed in succession by the layers L1, L2 and L3. The processing operations of the layer L1 correspond for example to the conversion of the optical signal received into an electrical signal through an optical receiver, then amplified electrically.

The processing operations of the layer L2 corresponds for example to the “unscrambling” of the binary sequence received, to the extraction of the administration and management information originating from the ONU, to the reconstruction of the GEM frames from the GTC frames, to the decryption of the GEM frames, or to the assembly of the GEM frames to re-form the SDU frames (composed of Ethernet frames or of OMCI messages).

The processing operations of the layer L3 correspond for example to the switching of the Ethernet or OMCI frames to their destination, indicated by the “MAC destination” address in the case of an Ethernet frame, or to the management entity of the OMCI, in the second case.

The data of the frame Tm' are then transmitted in a second optical burst raising the PON1 to the layer L1 of the OLT1, which is also modified at its layer L3. Indeed, in the OLT1, after having undergone the processing operations of the layers L1 and L2 as in the prior art, when the data of the frame Tm' are delivered to the layer L3, the latter must determine whether they originate from the PON1 or the PON2 which is cascaded from the PON1.

This determination can be made, in a first mode of operation, by estimating that the form of the frames does not correspond to the Ethernet frames or to the OMCI messages normally received at the layer L3 in the prior art, or when transmitted by the PON1 only. The OLT1 then determines that the form of the frames is abnormal, and estimates that that means that the frames originate from the PON2 and have not finished being processed.

In another embodiment, the frame Tm' which is delivered by the OLT2 in the upstream direction undergoes an encapsulation in Ethernet frames at the OLT2 before reaching the ONU1a. The headers of these Ethernet frames make it possible to switch the frame Tm' to a module of the OLT1 in the layer L3 (illustrated in FIG. 2 by a rectangle denoted L2 in the rectangle denoted L3) performing the processing operations of layer L2 not performed by the OLT2, after having undergone the processing operations of the layers L1 and L2 of the OLT1.

In these two modes of operation, the OLT1 therefore makes the frames Tm' once again undergo the processing operations of the layer L2 in the upstream direction, which have not been done by the OLT2, and delivers as output the frame Tm, and not the frame Tm'. It should however be noted that the data of the frames Tm and Tm' are the same; only their formats differ.

FIG. 3 schematically presents two cascade-connected passive optical networks, according to a second aspect of the invention.

This second aspect corresponds to a more general embodiment, in which the layer L3 is shifted in its entirety but not the layer L2 which is partially shifted, from the OLT2 to the OLT1, and in which the part of the layer L2 which is shifted is different depending on the transmission direction.

In the downstream direction, the set of the sublayers of the layer L2 that have been shifted is denoted L2d', and the set of the sublayers of the layer L2 which are not shifted is denoted L2d.

For example, the layer L2d' comprises the top sublayer of the ITU protocol stack called “Service Adaptation”, and the layer L2d comprises the lower layers of the ITU protocol stack called “Framing” and “PHY Adaptation”. The cut of the shift therefore lies between the “Service Adaptation” and "Framing" sublayers. In this example, for the data in the downstream direction, the OLT2 of the PON2 which is cascaded from the PON1 does not perform the processing operations relating to the "Service Adaptation" sublayer. It is the OLT2 of the PON1 which performs them.

Compared to the processing operations undergone by the downstream data of a Td frame described with reference to FIG. 2, the differences are as follows:

In the OLT1 of the PON1, the layer L3 encapsulates the frame Td in the layer L2d', before delivering it to the layer L2.

In the OLT2 of the PON2 which is cascaded from the PON1, the frame Td' which is recovered from the ONU1a, is delivered directly to the layer L2d of the OLT2.

In the upstream direction, the set of the sublayers of the layer L2 that have been shifted is denoted L2m', and the set of the sublayers of the layer L2 which are not shifted is denoted L2m.

For example, the layer L2m' comprises the upper sublayers of the ITU protocol stack called "Service Adaptation" and "Framing", and the layer L2m comprises the bottom layer of the ITU protocol stack called "PHY Adaptation". The cut of the shift is therefore located between the "Framing" and "PHY Adaptation" sublayers. In this example, for the data in the upstream direction, the OLT2 of the PON2 which is cascaded from the PON1 does not perform the processing operations relating to the "Service Adaptation" and "Framing" sublayers. It is the OLT2 of the PON1 which performs them.

Compared to the processing operations undergone by the upstream data of a frame Tm described with reference to FIG. 2, the differences are as follows:

In the OLT2 of the PON2 which is cascaded from the PON1, it is at the output of the layer L2m of the OLT2 that the frame Tm' is delivered directly to the layer L3 of the ONU1a.

In the OLT1 of the PON1, after the processing of the data of the frame Tm' by the layer L2, the layer L3 performs on these data for a second time the processing operations of the layer L2d', and delivers the frame Tm at the output of the layer L3.

It is understood that the advantages of this second embodiment are similar to those of the first embodiment: the OLT2 is lightened because it no longer has to perform certain processing operations relating to the service layer and to a part of the transport layer.

In both cases, the cascaded passive optical networks can use different bit rates and use protocol stacks of different standards (ITU for one and IEEE for the other, for example).

FIG. 4 presents an example of structure of an optical network terminal, implementing the data transmission method in a downstream optical signal, and the data reception method in an upstream optical burst, according to aspects of the invention.

The device 100 can be included in, or be, an optical line terminal such as, for example, OLT1.

For example, the device 100 comprises a receiver 101 of downstream data frames Td, a transmitter 102 of upstream data frames Tm, a transmitter 103 of downstream optical data signals S(Td'), a receiver 104 of upstream optical data bursts S(Tm'), a processing unit 130, equipped for example with a microprocessor µP, and driven by a computer program 110, stored in a memory 120 and implementing the transmission and reception methods according to the invention. On initialization, the code instructions of the computer program 110 are for example loaded into a RAM memory, before being executed by the processor of the processing unit 130.

Such a memory 120, such a processor of the processing unit 130, are able and configured for, in the downstream direction:

at the service layer (L3) in the downstream direction of the data, a processing of the data relating to at least one sublayer (L2d') of the transport layer, called downstream encapsulation, before transmission of the data processed at the transport layer (L2), optionally, at the service layer in the downstream direction of the data, and prior to the downstream encapsulation, another downstream encapsulation relating to at least one sublayer of the transport layer, and for, in the upstream direction:

at the service layer in the upstream direction of the data, a detection of a processing operation missing from the data, relating to at least one sublayer (L2m') of the transport layer, above a level called upstream encapsulation level, at the service layer in the upstream direction of the data, a processing of the data relating to the sublayers (L2m') above the upstream encapsulation level, called upstream decapsulation, to obtain a data frame, optionally, at the service layer in the upstream direction of the data, in the context of the detection of a processing operation missing from the data, either a verification that the data are not in an Ethernet or OMCI format, or a verification that the Ethernet frames containing the data include information indicative of an encapsulation, optionally, at the service layer in the upstream direction of the data, and following the processing operation relating to the sublayers above the upstream encapsulation level, detecting another processing operation missing from the data, relating to at least one sublayer of the transport layer, above another level called other upstream encapsulation level, then performing another processing of the data relating to sublayers of the transport layer above the other upstream encapsulation level, to obtain a data frame.

The device 100 also comprises, at the service layer (L3):

a unit 180 for transmitting the upstream frames Tm to the transmitter 102, and switching the downstream data frames Td originating from the receiver 101 to the transport layer or to the downstream encapsulation (L2d') depending on their destination, a unit OMCI1 for the management of the configurations, of the failures, of the performance levels, and of the security of the PON1, a unit OMCI2 for the management of the configurations, of the failures, of the performance levels, and of the security of the PON2 which is cascaded-connected to the PON1, a unit 190 for switching the upstream data originating from the transport layer to the unit 180, the unit OMCI1 or the upstream decapsulation (L2m'), depending on the detection of a processing operation missing from the data, a unit DBA2 (DBA standing for Dynamic Bandwidth Allocation) for managing the upstream bandwidth allocation of the PON2.

The device 100 also comprises, at the transport layer (L2):

a unit DBA1 for managing the upstream bandwidth allocation of the PON1, with which the unit DBA2 coordinates.

The device 100 can be composed of two distinct devices 100*d* and 100*m* (not illustrated), the device 100*d* comprising the components necessary to the downstream direction, and the device 100*m* comprising the components necessary to the upstream direction.

FIG. 5 presents an example of structure of an optical network gateway, implementing the data transmission method in a downstream optical signal, and the data transmission method in an upstream optical burst, according to aspects of the invention.

The device 200 can be included in, or be, an optical network gateway, that is to say a home or professional Internet access gateway, combining an ONU functionality and an OLT functionality, such as, for example, the gateway FGW.

For example, the device 200 comprises a receiver 201 of downstream optical data signals S(Td'), a transmitter 202 of upstream optical data bursts S(Tm'), a transmitter 203 of downstream optical data signals S(Td), a receiver 204 of upstream optical data bursts S(Tm), a unit (ONU1a) implementing an ONU functionality, a unit (OLT2) implementing an OLT functionality. The device 200 also comprises a processing unit 230, equipped for example with a microprocessor μP, and driven by a computer program 210, stored in a memory 220 and implementing the transmission methods according to the invention. On initialization, the code instructions of the computer program 210 are for example loaded into a RAM memory, before being executed by the processor of the processing unit 230.

Such a memory 220, such a processor of the processing unit 230, are able and configured for, in the downstream direction:

- at the service layer (L3) of the unit ONU1a and in the downstream direction of the data, a detection of an encapsulation of the data relating to at least one sublayer (L2d') of the transport layer (L2),
- a transmission of the downstream encapsulated data, from the unit ONU1a to the unit OLT2, directly to a level (L2d) immediately below the at least one transport sublayer, called encapsulation level, without processing relating to the at least one transport sublayer,
- at the transport layer (L2) of the unit OLT2, successive processing operations up to a physical layer (L1), from the encapsulation level,
- at the physical layer (L1) of the unit OLT2, a transmission of the data processed in a downstream optical data signal S(Td), to a passive optical network (PON2), and for, in the upstream direction:

- at a sublayer (L2m) of the transport layer (L2) of the unit OLT2, called encapsulation level, a transmission of the data (Tm') directly to a service layer (L3) of the unit ONU1a, without processing in the unit OLT2 by sublayers above the encapsulation level,
- successive processing operations in the unit ONU1a, by the service layer (L3), by a transport layer (L2) and by a physical layer (L1),
- a transmission of the processed data in an upstream optical burst S(Tm') to a passive optical network (PON1),
- optionally, at the encapsulation level, before the transmission of the data (Tm') to the service layer (L3) of the unit ONU1a, a formatting as Ethernet frame of the data and an insertion into the Ethernet frame of information indicative of the encapsulation.

The device 200 also comprises, at the service layer (L3) of the unit ONU1a:

- a unit 180 for transmitting the upstream data frames Tm' to the transmitter 202, and receiving from the receiver 201 the downstream data frames Td',
- a unit OMCI1 for the management of the configurations, of the failures, of the performance levels, and of the security of the system PON1.

In another embodiment that is not illustrated, the device 200 is separated into two distinct hardware entities. The first entity is a device 200*a* which comprises the ONU functionality, that is to say the elements 201, 202 and ONU1a of the device 200, in addition to a processing unit, equipped for example with a microprocessor μP, and driven by a computer program, stored in a memory.

The second entity is a device 200*b* which comprises the OLT functionality, that is to say the elements 203, 204 and OLT2 of the device 200, in addition to a processing unit, equipped for example with a microprocessor μP, and driven by a computer program stored in a memory.

In addition, each of the devices 200*a* and 200*b* has an interface at the service layer (L3) in order to exchange data frames with one another, for example an Ethernet interface.

The device 200 (respectively each of the devices 200*a* and 200*b*) can be composed of two distinct devices for the downstream and upstream directions, 200*d* and 200*m* (respectively 200*ad*, 200*bd*, 200*am*, 200*bm*, not illustrated), the device 200*d* (respectively 200*ad*, 200*bd*) comprising the components necessary to the downstream direction, and the device 200*m* (respectively 200*am*, 200*bm*) comprising the components necessary to the upstream direction.

The entities described and included in the devices described in relation to FIGS. 4 and 5 can be hardware or software. These figures illustrate only one particular way, out of several possible ways, of performing the method detailed above, in relation to the preceding figures. Indeed, the technique of the invention is carried out without preference on a reprogrammable computation machine (a PC computer, a DSP processor or a microcontroller) executing a program comprising a sequence of instructions, or on a dedicated computation machine (for example a set of logic gates like an FPGA or an ASIC, or any other hardware module).

In the case where the invention is located on a reprogrammable computation machine, the corresponding program (that is to say the sequence of instructions) will be able to be stored in a storage medium that is removable (such as, for example, a USB key, a diskette, a CD-ROM or a DVD-ROM) or not removable, this storage medium being able to be read partially or totally by a computer or a processor.

The invention claimed is:

1. An upstream data transmission method, implemented in an equipment at the boundary between a first passive optical network and a second passive optical network and comprising a reception protocol stack and a transmission protocol stack, data being received at a physical layer of the reception protocol stack in a first upstream optical burst originating from the second passive optical network, the method comprising, in succession:

- at a sublayer of a transport layer of the reception protocol stack, called encapsulation level, transmitting the data directly to a service layer of the transmission protocol stack, without processing by sublayers above the encapsulation level in the reception protocol stack,
- performing successive processing operations in the transmission protocol stack, by the service layer, by a transport layer and by a physical layer of the transmission protocol stack, and transmitting the data in a second upstream optical burst to the first passive optical network.

2. The upstream transmission method as claimed in claim 1, comprising, at the encapsulation level, before the transmission of the data to the service layer of the transmission protocol stack, a formatting as Ethernet frame of the data and an insertion into the Ethernet frame of information indicative of an encapsulation.

3. A reception method for receiving data in an upstream optical burst, implemented in a first optical line terminal of a first passive optical network, the data being received at a physical layer, then processed in succession and fully by the physical layer and by a transport layer, the method comprising, at a service layer, detecting processing operations missing from the data, relating to at least one sublayer of the transport layer, above an encapsulation level, at the service layer, processing the data relating to the sublayers of the transport layer above the encapsulation level, to obtain a data frame.

4. The reception method as claimed in claim 3, in which the detecting processing operations missing from the data comprises checking that the data are not in an Ethernet or OMCI (Optical Network Unit Management and Control Interface) format.

5. The reception method as claimed in claim 3, in which the detecting operations missing from the data comprises checking that Ethernet frames containing data comprise information indicative of an encapsulation.

6. The reception method as claimed in claim 3, in which the detecting processing operations missing from the data relates to all the sublayers of the transport layer.

7. The reception method as claimed in claim 3, comprising, following the processing relating to the sublayers above the encapsulation level:

at the service layer, another detection of processing operations missing from the data, relating to at least one sublayer of the transport layer, above another level called an encapsulation level, at the service layer, another processing of the data relating to sublayers of the transport layer above the other encapsulation level, to obtain a data frame.

8. An upstream data transmission device, at a boundary between a first passive optical network and a second passive optical network, comprising a reception protocol stack and a transmission protocol stack, data being received at a physical layer of the reception protocol stack in a first upstream optical burst originating from the second passive optical network, the device comprising:

receivers;

transmitters;

at least one processor; and at least one memory coupled to the at least one processor with instructions stored thereon which when executed by the at least one processor configure the upstream transmission device to:

at a sublayer of the transport layer of the reception protocol stack, called an encapsulation level, transmit the data to a service layer of the transmission protocol stack, without processing by sublayers above the encapsulation level in the reception protocol stack;

perform successive processing operations in the transmission protocol stack, by the service layer, by a transport layer and by a physical layer of the transmission protocol stack; and transmit the data in a second upstream optical burst to the first passive optical network.

9. A reception device for receiving data in an upstream optical burst, included in a first optical line terminal of a first passive optical network, the data being received at a physical layer, then processed in succession and fully by the physical layer and by a transport layer, the device comprising:

receivers;

transmitters;

at least one processor; and at least one memory coupled to the at least one processor with instructions stored thereon which when executed by the at least one processor configure the reception device to:

at a service layer, detect processing operations missing from the data, relating to at least one sublayer of the transport layer, above an encapsulation level; and at the service layer, processing the data relating to sublayers of the transport layer above the encapsulation level, to obtain a data frame.

10. The reception device as claimed in claim 9, further comprising a first unit which manages configurations, failures, performance levels and security of the first passive optical network, and a second unit which manages configurations, failures, performance levels, and security of the second passive optical network.

11. The reception device as claimed in claim 9, further comprising a first unit which manages an upstream bandwidth allocation of the first passive optical network, and a second unit which manages an upstream bandwidth allocation of the second passive optical network.

12. A system of cascaded passive optical networks for the reception of upstream data, comprising:

a plurality of upstream transmission devices;

a reception device connected to the plurality of upstream transmission devices through a first passive optical network for receiving data in a second upstream optical burst, the reception device being included in a first optical line terminal of the first passive optical network, the data being received at a physical layer, then processed in succession and fully by the physical layer and by a transport layer, the device comprising:

first receivers;

first transmitters;

at least one first processor; and at least one first memory coupled to the at least one first processor with instructions stored thereon which when executed by the at least one first processor configure the reception device to:

at a service layer, detect processing operations missing from the data, relating to at least one sublayer of the transport layer, above an encapsulation level; and at the service layer, processing the data relating to sublayers of the transport layer above the encapsulation level, to obtain a data frame, at least one of the plurality of upstream transmission devices being connected to a plurality of optical network units through the second passive optical network, at a boundary between the first passive optical network and the second passive optical network, and comprising a reception protocol stack and a transmission protocol stack, data being received at a physical layer of the reception protocol stack in a first upstream optical burst originating from the second passive optical network, the at least one upstream transmission device comprising:

second receivers;

second transmitters;

at least one second processor; and at least one second memory coupled to the at least one second processor with instructions stored thereon which when executed by the at least one second processor configure the at least one upstream transmission device to:

at a sublayer of the transport layer of the reception protocol stack, called an encapsulation level, transmit the data to a service layer of the transmission protocol stack, without processing by sublayers above the encapsulation level in the reception protocol stack;

perform successive processing operations in the transmission protocol stack, by the service layer, by a transport layer and by a physical layer of the transmission protocol stack; and transmit the data in a second upstream optical burst to the first passive optical network.

13. A non-transitory computer readable medium comprising a computer program stored thereon comprising instructions which, when executed by at least one processor, cause the at least one processor to implement the upstream transmission method, as claimed in claim 1.

14. A non-transitory computer readable medium comprising a computer program stored thereon comprising instructions which, when executed by at least one processor, cause the at least pone processor to implement the reception method, as claimed in claim 3.

* * * * *